United States Patent [19]

Simo et al.

[11] 4,267,061

[45] May 12, 1981

[54] PROCESS AND SEPARATING AND RECOVERING SOLIDS AND CLEAR LIQUID PHASE FROM DISPERSIONS

[75] Inventors: Thomas Simo, Frankfurt am Main; Roland Rammler, Königstein, both of Fed. Rep. of Germany

[73] Assignee: Metallgesellschaft Aktiengesellschaft, Reuterweg, Fed. Rep. of Germany

[21] Appl. No.: 1,100

[22] Filed: Jan. 4, 1979

Related U.S. Application Data

[63] Continuation of Ser. No. 815,465, Jul. 13, 1977, abandoned, which is a continuation of Ser. No. 647,831, Jan. 9, 1976, abandoned.

[30] Foreign Application Priority Data

Feb. 4, 1975 [DE] Fed. Rep. of Germany ....... 2504487

[51] Int. Cl.³ .......................................... B01D 43/00
[52] U.S. Cl. .................................. 210/772; 210/805; 208/39
[58] Field of Search ................. 210/59, 60, 71, 65-67, 210/70, 73 W, 83, 84; 208/39, 42, 43, 8, 13; 423/526, 527

[56] References Cited

U.S. PATENT DOCUMENTS

| 2,871,181 | 1/1959 | Kulik | 208/8 |
| 2,956,944 | 10/1960 | Logan et al. | 210/67 |
| 3,010,893 | 11/1961 | Kulik | 208/42 |
| 3,305,474 | 2/1967 | Knowles et al. | 208/39 |
| 3,692,668 | 9/1972 | McCoy et al. | 208/13 |

FOREIGN PATENT DOCUMENTS 849987  9/1960  United Kingdom ..................... 208/39

Primary Examiner—Benoit Castel
Attorney, Agent, or Firm—Sprung, Felfe, Horn, Lynch & Kramer

[57] ABSTRACT

Solids and a clear liquid phase are separated and recovered wherein the solids are suspended in high boiling liquids. The sludge phase is separated from the liquid phase. A separate liquid phase which has a higher density than the liquid content of the sludge phase is added to the dispersion to be separated or to the sludge phase and the resulting mixture is centrifuged to separate the solids from the liquid phase.

4 Claims, 1 Drawing Figure

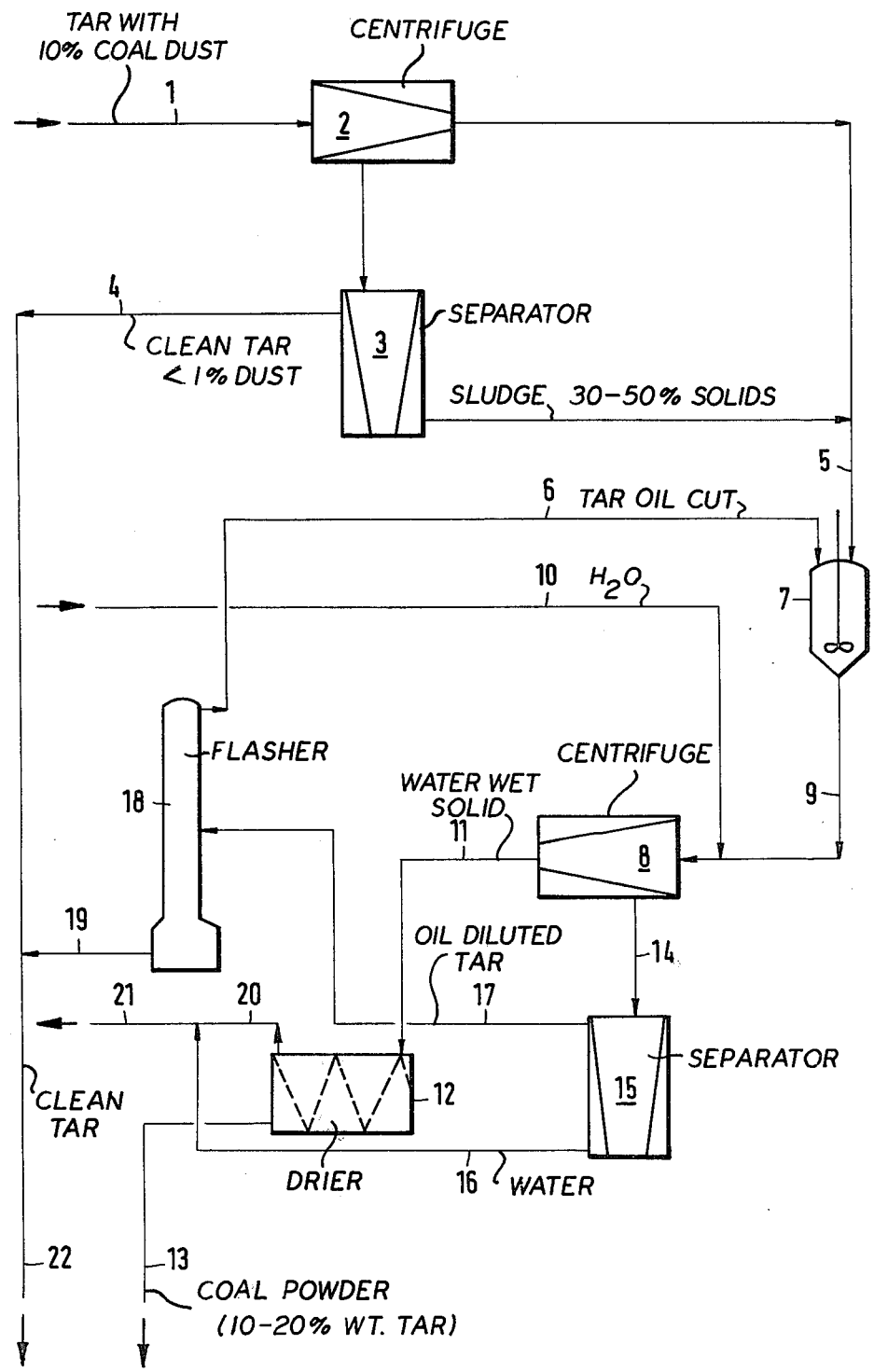

PROCESS AND SEPARATING AND RECOVERING SOLIDS AND CLEAR LIQUID PHASE FROM DISPERSIONS

This is a continuation of application Ser. No. 815,465 filed July 13, 1977, now abandoned, which is in turn a continuation of application Ser. No. 647,831 filed Jan. 9, 1976 and now abandoned.

BACKGROUND

This invention relates to a process of separating and recovering solids and a clear liquid phase from dispersions wherein the solids are suspended in high-boiling liquids, and in particular, to a process involving separation of the sludge phase from the liquid phase followed by processing of the separated phases.

In conjunction with heterogeneous catalytic processes carried out in the liquid phase and with the collection of dust from tar products formed by the gasification of coal, the dry distillation of coal, the hydrogenation of coal, the extraction of coal and others, it is desired to separate dispersed solids from high-boiling liquids with minimum losses in order to recover the solids and to clarify the liquid of all components which are apt to form sediments.

It is known to accomplish these objects by sedimentation, centrifugation or filtration or by means of hydrocyclones. Where substances having suitable properties are involved, electrostatic separation may be performed or may be combined with one of the preceding processes.

All these processes may be used to produce a more highly concentrated suspension of solids, which is referred to as a sludge phase or filter cake, and a liquid phase having a relatively low solids content. In most cases, the original liquid phase can be removed from the sludge phase by a substitution of the latter by the solvents employed.

In many cases, the substances involved have such properties, e.g., in respect of viscosity, density, etc., that the separation itself can be accomplished only when solvents are added. This is particularly applicable to natural sedimentation by gravity.

In commercial application, the known processes are not satisfactory for a substantially loss-free separation of suspended solids in high-boiling oils, tars and the like without using solvents in considerable amounts and loosing the liquid component.

SUMMARY

This invention avoids the disadvantages of prior processes and accomplishes the separation in a simple manner. Moreover, the process makes possible a clarification by which the solids are removed from the liquid phase to a such high degree and without loss that the solids become available in a dry state and are suitable for further processing, regeneration, and the like.

This is accomplished by adding a liquid phase which has a higher density than the liquid content of the sludge phase, to the dispersion to be separated or to the sludge phase. The resulting mixture is centrifuged and the solids are then separated from the liquid phase.

DESCRIPTION OF THE DRAWING

The present invention will be more fully understood from the following description taken in conjunction with the accompanying drawing which is a flow diagram of the process of the invention.

DESCRIPTION

The added liquid phase is suitably selected so that it is not soluble in nor does it mix with the liquid phase of the sludge. It should be selected to have such a boiling point that it can be removed by evaporation, drying or the like and can be recycled, if desired.

Within the scope of the invention, water has proved particularly suitable for this purpose. In some cases it may be desirable to add surfactants to the water.

After the centrifugation, the solids are contained in the added water. In this case the water-wet sludge formed by the solids can easily be dried. Besides, the surplus water can easily be separated from most high-boiling oils, tars and the like.

It may be necessary to reduce the density of the liquid constituents of the sludge and the viscosity of the sludge. This can be accomplished by a continuous addition of a suitable cut of the oil, tar, etc., preferably formed during the process itself by separation of the clarified oil from the water.

According to a further feature of the invention, the added liquid phase of higher density is separated from the lighter phase after the solids have been separated and the added liquid phase of higher density is recycled.

The liquid phase of higher density may be processed and purified before being recycled.

According to an additional feature of the invention, the liquid used as added liquid phase is branched from process stream and is united with the same again after the subsequent removal, and the united liquids are jointly processed. This process stream can be for example a gas liquor of the coal gasification or a liquor stream of the dry distillation of coal, oil shale etc.

Also within the scope of the invention, the cut which has been added to reduce the density and/or viscosity of the sludge phase is recovered and subsequently recycled.

The advantages afforded by the invention reside particularly in that a simple and economical process is provided which enables a satisfactory separation of dispersions which can be separated only with difficulty. This is particularly applicable to suspensions in which fine-grained or amorphous substances such as coal powders are highly dispersed in high-boiling liquids such as in high-boiling oils, hydrocarbons, and tars. The resulting solids become available in a form in which they can easily be separated, the liquid constituents can be removed (from the solids) by a simple drying step and the solids can be put to further use immediately. The dispersing liquid phase, e.g., high-boiling oils and tars, and the added liquid can easily be separated and recovered and immediately or after a suitable regeneration if this is desired, may be re-used in the same process, if required.

The process will be described more fully with reference to the drawing, which represents a flow scheme of the process according to the invention and shows diagrammatically and by way of example the process of removing dust from tar produced by the pressure gasification of coal.

Heavy tar which has become available in the pressure gasification of coal and in which 10% by weight coal dust is dispersed is fed through 1 and is clarified in two stages at elevated temperatures in a solid bowl-conveyor centrifuge 2 and a separator 3. This results in 70–80 parts by weight clear tar (having a solids content of less than 1% by weight in the form of particles below 5 microns and containing no constituents which can form sediment) and 20–30 parts by weight of concentrated sludge having a solids content of 30–50% by weight. The clear tar is withdrawn through 4. The sludge is fed through 5 and is mixed in 7 with a tar oil cut, which is fed through 6 and has a boiling range up to 170° C. This dilute stream 9 is mixed with water 10 in proportions of 1 part by weight of water per 4 parts by weight of dilute sludge and the mixture is fed into the solid bowl-conveyor centrifuge 8. Water-wet solids 11 are recovered and coal powder which contains 10–20% by weight tar constituents. The liquid phase 14 from the solid bowl-conveyor centrifuge 8 is separated from water 16 in a separator 15 (preferably a separating tank or vessel) and the oil-diluted tar 17 is fed to a flasher 18, from which stream 6 is recovered. The remainder 19 is united with the clear tar. The water stream 16 and the condensate 20 from the dryer are jointly fed into the clarifier.

Because gas water becomes also available in the pressure gasification of coal, it is suitable to take the stream 10 from the gas water stream and to feed the stream 21 into the plant for purifying the gas water.

The clear tar from line 22 can be processed further by separating via distillation in suitable columns. The dry coal powder from line 13 may be briquetted without a further addition of binder or may be fired in powderized-coal furnaces.

To ensure that the solids are separated from the liquid constituents as completely as possible and that the recovered solids contain only a minimum of oil, it may be desirable to centrifuge in three phases at an elevated temperature. The separation of the oil from the water in the separator tank 15 may also be promoted by the selection of a suitable temperature.

Similar developments of the process may be adopted, e.g., in the recovery of catalysts from residual oil, or from the primary product of the hydrogenation of bitumen carried out in a fluidized catalyst bed if it is not desirable or possible, because of process technology, to burn off the carbonaceous constituents.

What is claimed is:

1. Process for separating solids from high-boiling liquid hydrocarbons, preferably high-boiling oils or tars, which comprises feeding solids-containing liquid hydrocarbons into a first separation zone, separately withdrawing from said first separation zone a solids-enriched sludge phase and a liquid hydrocarbon phase containing less than 1% by weight of solids with a particle size below 5 microns, reducing the density and/or the viscosity of the liquid constituents of the sludge phase by the addition of a hydrocarbon fraction obtained from high-boiling hydrocarbons withdrawn from a second separation zone, recovering the hydrocarbon fraction added to reduce the density and/or viscosity of the sludge phase in a flashing zone from the hydrocarbons withdrawn from the second separation zone and subsequently recycled to said sludge phase, adding water to the sludge phase and feeding the resulting mixture into a centrifuging zone, separately withdrawing from said centrifuging zone a liquid phase and a high-solids phase, feeding said liquid phase to said second separation zone and separately withdrawing water and the high-boiling hydrocarbons therefrom.

2. Process of claim 1 wherein surfactants are added to the water which is added to the sludge phase.

3. Process of claim 1 wherein the water withdrawn from the second separation zone is recycled to the sludge phase.

4. Process of claim 3 wherein the water from the second separation zone is processed and purified before being recycled.

* * * * *